M. G. HUBBARD.
Grain Gleaner and Binder.
No. 208,736. Patented Oct. 8, 1878.
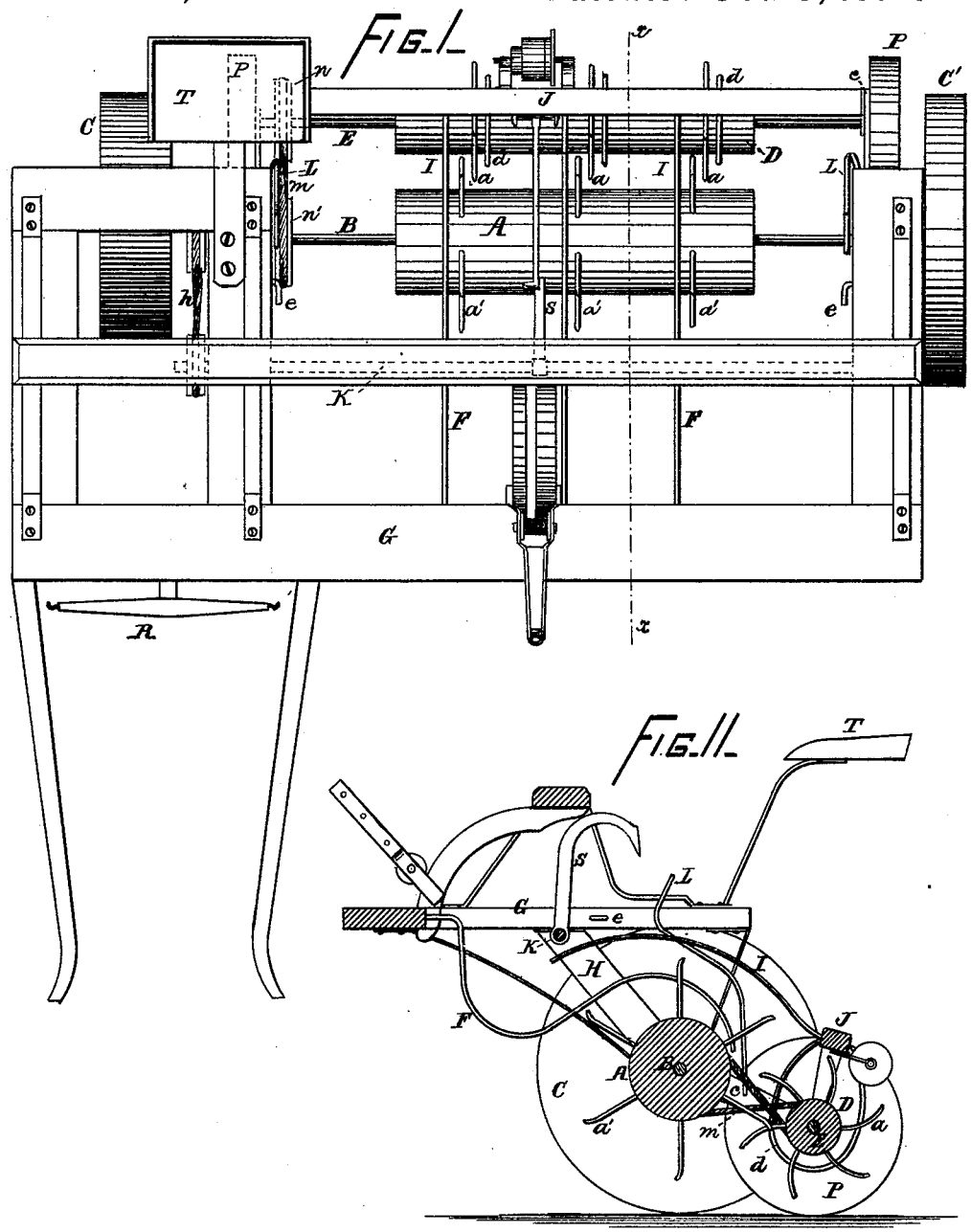
Witnesses:
W. R. Wright
Albert E. Zacherle
Inventor
Moses G. Hubbard
by his Attorney
George Harding

UNITED STATES PATENT OFFICE.

MOSES G. HUBBARD, OF NORRISTOWN, PENNSYLVANIA.

IMPROVEMENT IN GRAIN GLEANER AND BINDER.

Specification forming part of Letters Patent No. 208,736, dated October 8, 1878; application filed May 13, 1878.

*To all whom it may concern:*

Be it known that I, MOSES G. HUBBARD, of Norristown, in the county of Montgomery and State of Pennsylvania, have invented a new and useful Improvement in Machines for Gleaning and Binding Grain; and I do hereby declare the following to be a full, clear, and exact description thereof, reference being had to the accompanying drawings, which form part of this specification, and in which—

Figure I is a plan view of my improved machine; and Fig. II, a vertical sectional view of the same through the line $x\ x$, Fig. I.

Similar letters of reference refer to corresponding parts in both figures.

My invention consists of a light, portable machine, easily drawn by one horse and controlled by a boy, which, when passing over a field of grain cut and deposited in gavels by a harvesting-machine, gleans and elevates the grain from the ground onto a carrier, where, by a suitable automatic device, it is bound and afterward thrown upon the ground.

In the drawings, A represents an elevating-cylinder, mounted on a shaft, B, which is driven by the driving-wheel C, and connects said driving-wheel C and supporting-wheel C'. D is a smaller cylinder mounted on a shaft, E, in the rear of the main shaft B. Both cylinders are provided with teeth $a\ a'$, the teeth of the rear cylinder, D, gleaning the grain from the ground, while the teeth of the front cylinder elevate the grain to the bundle-carriers F F, as hereinafter described.

The elevating-cylinder A is constructed of such a size in proportion to the lengths of straw that the straw will not readily encircle and clog up the cylinder, which is always the case when the elevating-cylinder is of small diameter.

G is a light frame or platform, supported on the main shaft B, at its inner and outer ends, by the braces H H. The carrying-scrolls F F are joined at one end to the front sill of the frame G. From these they are bent in the manner shown in the drawing, so as to form a receptacle for the bundle. The other ends are brought over and down close to the elevating-cylinder A at this point, acting to clean the grain from the teeth of the elevating-cylinder. I I are guiding-scrolls attached to the rear sill, J, which is mounted on the shaft E by the arms $c\ c$. The arms $c\ c$ also connect the gleaning-cylinder D to the main shaft by a hinged joint, which permits the cylinder to follow uneven ground, and also to be thrown up when not in use, as hereinafter described. The scrolls I I extend forward nearly to the binder-shaft K, but are separate from it. Extending from the rear sill, J, around the smaller cylinder D, are cleaning-scrolls $d\ d$, which clean the straw from the teeth $a\ a$ of the gleaning-cylinder.

L L are hand-levers, which are attached at their lower ends to the arms $c\ c$ on the shaft E. When the machine is not in use the driver, by throwing the levers forward, raises the gleaning-cylinder D, together with the shaft E and wheels P P, from the ground, and secures it in that position by fastening the levers in the catch $e$.

The binding-shaft K is mounted on the frame G at both its inner and outer ends, and is driven in a direction contrary to that of the main shaft B by means of a crossed band or chain, $h$, passing over pulleys K K on the inner ends of the main and binding shafts. By thus giving the binding-shaft a contrary direction to that of the main shaft the binding-arm S, mounted on the binding-shaft, throws the bound bundle up and over the binding-shaft onto the ground to the rear of the machine.

The gleaning-cylinder D is revolved in a direction contrary to that of the elevating-cylinder A by means of a crossed band or chain, $m$, passing over pulleys $n\ n'$ on the inner ends of the shafts B and E. This crossed band or chain also assists in supporting the gleaning-cylinder D, allowing the same to pass lightly over the inequalities of the ground.

It is necessary for the points of the elevating-teeth and gleaning-teeth to revolve at about the same speed while gathering and elevating the gavel. Therefore, when I make the elevating-cylinder twice as large as the gleaning-cylinder, I make the band or chain wheels $n\ n'$ of the same proportionate size. This arrangement causes the ends of the teeth on both cylinders to revolve with about equal speed, and thereby prevents any unfavorable action on the straw.

T is a driver's seat, which is mounted on the frame G, and R are thills, to which a horse is attached when the machine is to be put in operation.

The operation of my machine is as follows: The grain having been previously cut and deposited in gavels, in the ordinary manner, by a harvesting-machine, I follow with my machine in the path previously made by the harvesting-machine. The interval between the cutting and laying the grain and gleaning and binding it can be left to the convenience of the operator and the necessities of the case, thereby avoiding the improper binding, which is often inevitable when the ordinary form of binder, as attached and operating with the cutting devices, is used. On reaching a gavel, the teeth $a\ a$ of the gleaning-cylinder D glean and carry the grain to the elevating-cylinder A, the scrolls $d\ d$, attached to the rear sill, J, cleaning the grain from the teeth $a\ a$, and preventing it from winding around and clinging to the gleaning-cylinder.

The grain is seized by the teeth $a'\ a'$ of the elevating-cylinder A, and carried by them up to the carrying-scrolls F F, where it is deposited, and afterward bound by any suitable way of operating the binding-arm S.

When the next gavel is reached the above operation is repeated, in this manner doing all the work by one horse and a boy which formerly required the services of five men.

Having thus described my invention, what I claim, and desire to secure by Letters Patent of the United States, is—

1. The combination of a large toothed elevating-cylinder, mounted on the main shaft between the driving and supporting wheels of a gleaning and binding machine, with a smaller toothed gleaning-cylinder, substantially as shown and described.

2. In combination with the elevating and gleaning cylinders, the carrying-scrolls F F, attached to the front sill of the frame G, and the guiding-scrolls I I, attached to the rear sill, J, substantially as shown and described.

3. The levers L L, in combination with the gleaning-cylinder of a gleaning and binding machine, when said cylinder is hinged to the main shaft and located in the rear thereof, so as to follow the uneven surfaces of the ground, substantially as shown and described.

4. In a machine for gleaning and binding grain, the two toothed cylinders, revolved in opposite directions by a crossed band or chain, in combination with the carrying and guiding scrolls of said machine, and automatic binding mechanism, to which the gathered grain is fed by said cylinders and scrolls, substantially as described, and for the purpose set forth.

5. The combination, with raking and gleaning mechanism, of a rotating binding-arm placed above the path of feed of the gra and rotating reversely to the drive-wheel o the machine, whereby the gavel is bound and delivered up and over the binder-shaft, and onto the ground in the rear of the machine, substantially as shown and described.

6. A pair of toothed cylinders of unequal size revolving in opposite directions at speeds proportioned to their respective sizes, in combination with the gavel-trough and binding mechanism of a gleaning and binding machine, substantially as shown and described.

MOSES G. HUBBARD.

Witnesses:
FREDERICK BELCHER,
ABM. S. HALLMAN.